Patented Sept. 30, 1941

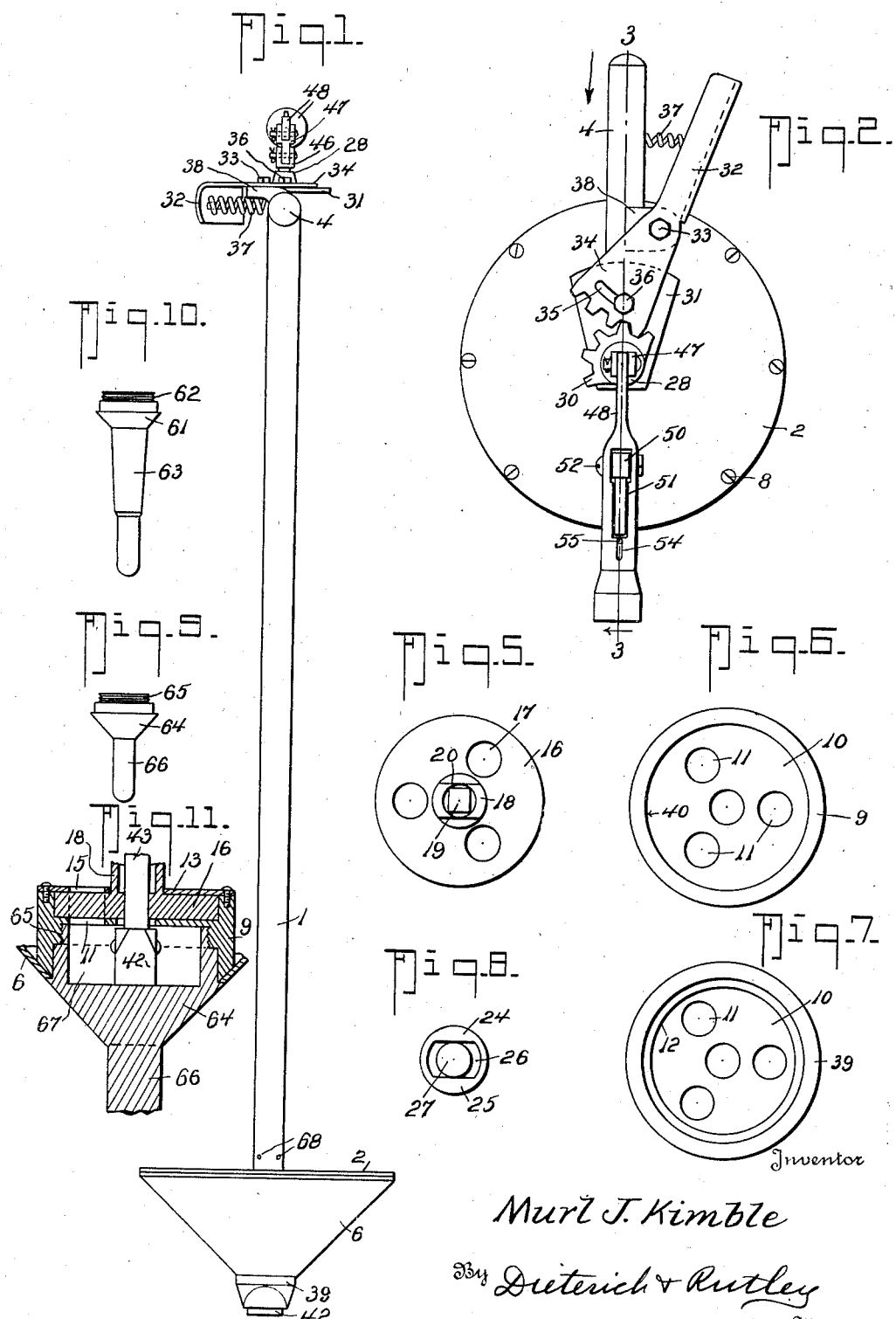

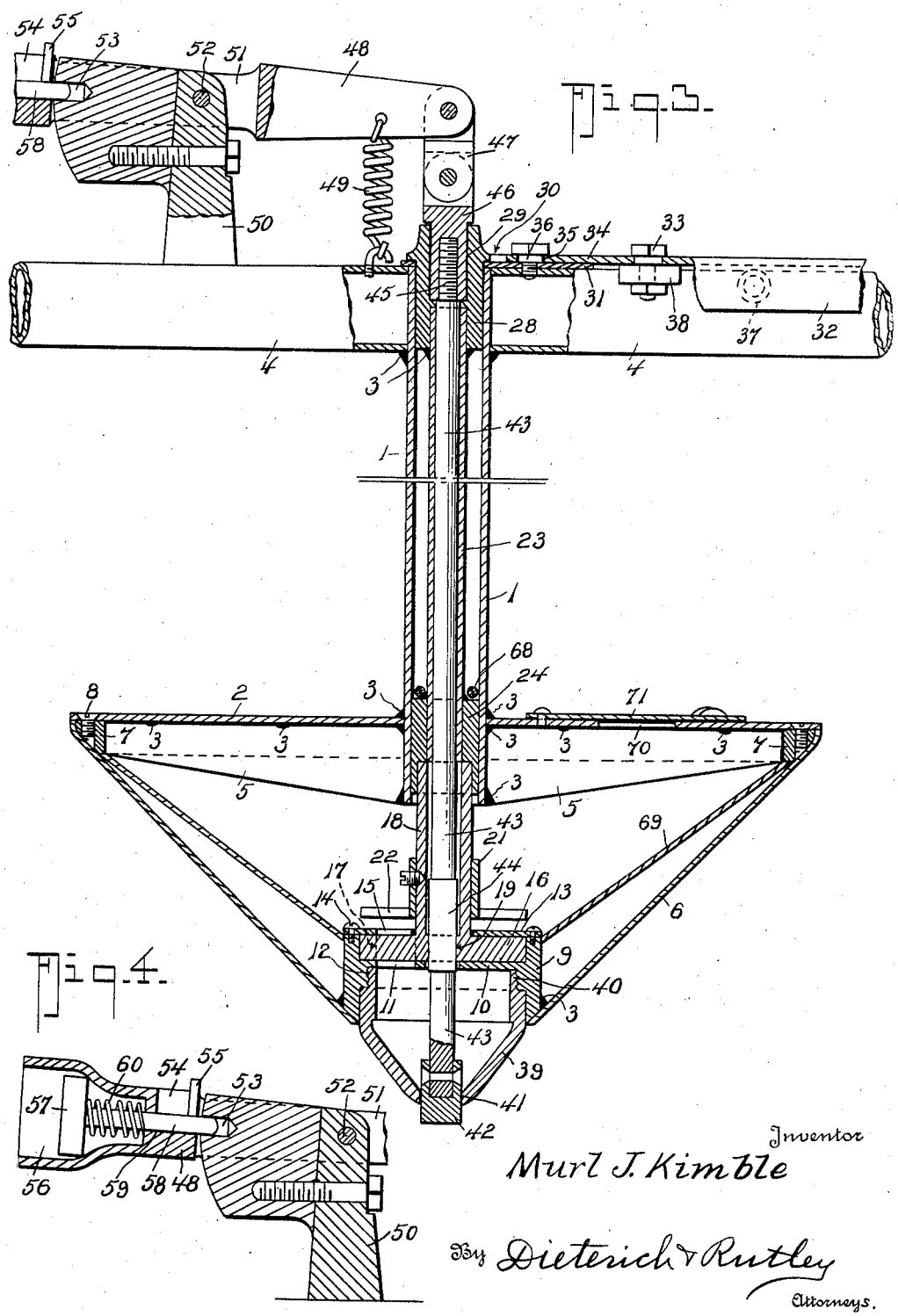

2,257,527

UNITED STATES PATENT OFFICE 2,257,527

PLANT SETTER AND CORN AND BEAN PLANTER COMBINATION

Murl John Kimble, Billings, Mont.

Application April 26, 1940, Serial No. 331,879

14 Claims. (Cl. 111—96)

My invention relates to implements used in the setting of young plants in the ground and for planting corn and bean seeds in cone recesses under hot caps.

It has for an object to provide a strong, inexpensive-to-manufacture implement which, when pressed into the ground, will provide a conical recess at the bottom of which will be formed a smaller recess or pocket for the reception of the roots of a plant and the root-covering earth (or seeds, accordingly as young plants or seeds are being planted), thereby leaving around the plant a shallow well or cone-shaped depression in the soil so that when a hot-cap is placed over the well the cubic air space is increased over that of the cap itself, so that frost-bite and sunburn are greatly reduced; also, when the depression is left uncapped, it forms a convenient receptacle for water when watering the plants.

A further object is to provide a seed planter which will, on pressing it into the surface of the ground, form a conical recess with a seed cup at the bottom, deposit seed in the cup, and then push the seed into the dirt at the bottom of the cup about five-sixteenths of an inch, giving just enough room for covering, which will allow quick germination.

Other objects will in part be obvious and in part be pointed out hereinafter.

To the attainment of the aforesaid objects and ends the invention still further resides in the novel details of construction, combination and arrangement of parts, all of which will be first fully described in the following detailed description, and then be particularly pointed out in the appended claims, reference being had to the accompanying drawings, in which:

Fig. 1 is an elevation of the implement, looking in the direction of the arrow in Fig. 2.

Fig. 2 is an enlarged top plan view of the implement.

Fig. 3 is an enlarged detail vertical section on the line 3—3 of Fig. 2.

Fig. 4 is a detail section later again referred to.

Fig. 5 is a top plan view of the rotary valve unit.

Fig. 6 is a top plan view of the valve seat and penetrating-element-coupling unit.

Fig. 7 is an inverted plan view of the same.

Fig. 8 is a detail inverted plan view of the valve actuating rod's lower coupling end.

Fig. 9 is a detail elevation on the scale of Fig. 1, showing a form of penetrating element used to form the pocket in which cabbage, cauliflower, peppers, egg-plant, broccoli, etc. are planted.

Fig. 10 is a similar view to Fig. 9 of a longer element used when planting tomatoes.

Fig. 11 shows how the attachments of Figs. 9 and 10 hold up the plunger member.

In the drawings, in which like numerals of reference indicate like parts in all the figures, 1 is a tube or pipe, in practice of a length of about thirty inches, to the lower end of which is secured a disc 2 of about nine inches diameter in practice. The disc 2 is braced or stiffened by radial braces 5 welded to the disc and to the tube 1 as at 3, or otherwise suitably rigidly secured so that tube 1, disc 2 and braces 5 constitute an integral structure. The braces 5 terminate short of the periphery of the disc 2 to leave room for the shell ring 7 which is permanently secured to the frusto-conical shell 6 by welding, or any other suitable means. The ring 7 and disc 2 are detachably secured rigidly together by screws 8.

At its end of lesser diameter the shell 6 is permanently secured to the combined coupling member and rotary valve case element 9. This element 9 has a web 10 constituting a valve seat, the web having a central aperture for the rod 43, later again referred to, and has seed passages 11 controlled by the rotary valve 16. The element 9 also has a threaded recess 12 into which is screwed the threaded end 40 of the penetrating cone 39, or the threaded end 62 or 65 of the penetrating elements shown in Figs. 10 and 11, later again referred to.

The rotary valve 16 is held in the recess above web 10, by a plate 13 secured at 14 and having passages 15 registering with the passages 11. The valve 16 has passages 17 which, when the valve is in the open position, register with the passages 11 and 15, but which are normally out of register with the same. The stem 18 of the valve 16 passes through a central hole in the plate 13 and is hollow, while the valve 16 has a squared hole 19 to receive the squared part 44 of the rod 43 (see Fig. 3).

The valve stem 18 has its upper end provided with flats 20 (Fig. 5) to fit into the socket 26 which has corresponding flats 25 so as to couple stem 18 to the coupling 24 which is welded, or otherwise rigidly secured, to the hollow valve turning rod 23. The coupling 24 has a bore 27 to fit on rod 23. The coupling 24 also serves as a lower bearing for rod 23 in tube 1 (Fig. 3).

An agitator comprising a sleeve 21 and fingers 22 is adjustably secured on the stem 18 by a set screw or other suitable means, to prevent the seed from jamming the passages 15.

At the upper end of tube 1 the rod 23 is fitted into an upper plug bearing 28 and welded or otherwise secured permanently to the rod as at 3 (3 at all places in the drawings indicating welds).

The upper bearing 28 has a bore 29 to receive the forked head 46 whose shank fits within the bore 29 and is screwed onto the threaded end 45 of the rod 43. The rod 43 at its lower end carries an elongated seed pusher and penetrating element closer 42 which normally lies in the elongated opening 41 and projects, in practice, about three-eighths of an inch below the element 39. The rod 43 has a squared portion 44 which normally lies in the squared opening 19 and locks valve 16 against being turned.

The upper bearing member 28 has a toothed segment 30 (Fig. 2) which meshes with a toothed segment 34 on a hand lever 32 which is pivoted at 33 to a bracket 38 projecting from handle 4 and which lies over a plate 31 carrying a stud 36 that projects through a slot 35 in segment 34 to limit movement thereof.

A spring 37 continuously tends to keep valve 16 closed.

A lever 48 is connected to the forked head 46 by a link 47. The lever is pivoted at 52 to a post 50 which projects into a slot 51 in lever 48 and has a wing that is provided with a latch receiving recess 53 (Figs. 3 and 4). A spring 49 continuously tends to force rod 43 down.

The lever also has a short narrow slot 54 for the stop pin 55 which is carried by the latch bolt 58 that works in a bore 59 and has a head 57 operating in chamber 56 of the lever, a spring 60 serving to retract bolt 58 when released.

When the tool is to be used simply for forming the conical recesses and root cups for plants, the element 39 is unscrewed (after raising 42 clear of 41) and one of the attachments of Figs. 9 and 10 is substituted. These attachments each comprise a frusto-conical body 61 or 64 having threaded ends 62 or 65 and soil penetrating pins 63 or 66.

Each of these attachments (Figs. 9 and 10) have recesses 67 (see Fig. 11) to receive the member 42 and hold it up in an inactive position when the seed planting features are not in use.

Cotter pins 68 may be provided if desired to prevent coupling 24 from rising when rod 43 is raised.

*Operation*

Assume that it is desired to use the appliance for forming conical holes in the ground with seed pockets at the apexes of the cones and to deposit seed in such pockets; the operator fills hopper 69 with seed through hole 70 (a gate 71 normally closes the hole 70).

He then presses down on handle 4 to force the elements 39 and 6 into the ground until the surface of disc 2 is flush with the ground surface. While holding the tool in this position, he raises the element 42 by pressing down the free end of lever 48. This raises the squared portion 44 above the hole 19 and leaves valve 16 free for operation. While holding lever 48 down, he now rocks lever 32 toward handle 4. This brings holes 15, 17, 11 into register and permits seeds to pass into element 39 to opening 41 and ground. He then releases lever 32 and then lever 48. Spring 49 then forces plunger 42 down through hole 41 pushing the seed beneath it into the ground.

The tool is then lifted out of the hole in the ground and the seed covered with dirt. A hot cap may then be placed over the hole and the seed left to germinate.

The plunger 42 is held down, while pressing the tool in the ground, by the latch bolt 58 being pressed into recess 53 (Fig. 3). The bolt 58 will instantly spring back when pressure on it is released.

When planting tomato vines the long penetrating pin 63 (Fig. 10) is substituted for member 39 and when planting cabbage, cauliflower, peppers, egg-plant, broccoli, etc. the short pin 66 (Fig. 9) is used.

From the foregoing description, taken in connection with the accompanying drawings, it is thought the construction, operation and advantages of the invention will be apparent to those skilled in the art.

While I have illustrated the preferred embodiment of the invention, I do not wish to be limited to the precise construction shown as changes in the details of construction, arrangement and design of parts can readily be made without departing from the invention within the scope of the appended claims.

What I claim is:

1. An appliance for the purposes described, comprising an elongated tube, a disc rigidly secured adjacent one end of the tube, a handle secured to the other end of the tube, a frusto-conical shell secured at its end of greater diameter to said disc, a coupling member rigidly secured within said shell to its end of lesser diameter, and a penetrating element removably secured to said coupling member.

2. An appliance for the purposes described, comprising an elongated tube, a disc rigidly secured adjacent one end of the tube, a handle secured to the other end of the tube, a frusto-conical shell secured at its end of greater diameter to said disc, a coupling member rigidly secured within said shell to its end of lesser diameter, and a penetrating element removably secured to said coupling member and having a frusto-conical portion whose surface constitutes an approximate continuation of that of said shell.

3. An appliance for the purposes described, comprising an elongated tube, a disc rigidly secured adjacent one end of the tube, a handle secured to the other end of the tube, a frusto-conical shell secured at its end of greater diameter to said disc, a coupling member rigidly secured within said shell to its end of lesser diameter, a penetrating element removably secured to said coupling member, said penerating element comprising a hollow tapered body having an angular opening in its outer end, a combined seed pusher and penerating element closer normally held in said angular opening, means for raising and lowering said combined seed pusher and penetrating element closer, means for storing seed in said shell, and means for dispensing the seed through said hollow tapered body.

4. In an appliance for the purposes described, an elongated tube, a conical receptacle secured at its base to the lower end of the tube and having an outlet at its apex, a plunger normally closing said outlet and projecting through the same, a handle on the upper end of said tube, means on said handle and connected with said plunger for raising and lowering the same, and means controlled from said handle for dispensing seed placed in said receptacle, through said outlet when the plunger is up.

5. In an appliance for the purposes described, an elongated tube, a conical receptacle secured at its base to the lower end of the tube and having an outlet at its apex, a plunger normally closing said outlet and projecting through the same, a handle on the upper end of said tube, means on said handle and connected with said plunger for raising and lowering the same, means controlled from said handle for dispensing seed placed in said receptacle, through said outlet when the plunger is up, and means for holding said plunger in the normal position while pressing said receptacle into the ground.

6. In an appliance for the purposes described, an elongated tube, a conical receptacle secured at its base to the lower end of the tube and having an outlet at its apex, a plunger normally closing said outlet and projecting through the same, a handle on the upper end of said tube, means on said handle and connected with said plunger for raising and lowering the same, means controlled from said handle for dispensing seed placed in said receptacle, through said outlet when the plunger is up, means for holding said plunger in the normal position while pressing said receptacle into the ground, and means operating upon release of said plunger while said receptacle is in the ground for forcing the plunger down to press the seed into the ground.

7. In an appliance for the purposes described, an elongated tube, a crossed handle secured to said tube adjacent one end of the same, a frusto-conical shell having a ring at its end of greater diameter, means secured to said tube adjacent its lower end and to said ring for rigidly holding said shell in place, the axis of the shell and tube coinciding, a combined coupling and rotary valve cage member secured to the end of lesser diameter of said shell, a penetrating element removably secured to said combined member and having an elongated opening, a combined seed pusher and penetrating element closer held normally in said opening, said combined member having a valve seat with seed passages, a disc valve on said seat and constructed for opening and closing said seed passages, and means mounted on said handle and operatively connected through said elongated tube with said combined seed pusher and penetrating element closer and with said valve respectively for operating the same.

8. In an appliance for the purposes described, an elongated tube, a crossed handle secured to said tube adjacent one end of the same, a frusto-conical shell having a ring at its end of greater diameter, means secured to said tube adjacent its lower end and to said ring for rigidly holding said shell in place, the axis of the shell and tube coinciding, a combined coupling and rotary valve cage member secured to the end of lesser diameter of said shell, a penetrating element removably secured to said combined member and having an elongated opening, a combined seed pusher and penetrating element closer held normally in said opening and projecting in part through the same, said combined member having a valve seat with seed passages, a disc valve on said seat and constructed for opening and closing said seed passages, and means mounted on said handle and operatively connected through said elongated tube with said combined seed pusher and penetrating element closer and with said valve respectively for operating the same.

9. In an appliance for the purposes described, an elongated tube, a crossed handle secured to said tube adjacent one end of the same, a frusto-conical shell having a ring at its end of greater diameter, means secured to said tube adjacent its lower end and to said ring for rigidly holding said shell in place, the axis of the shell and tube coinciding, a combined coupling and rotary valve cage member secured to the end of lesser diameter of said shell, a penetrating element removably secured to said combined member and having an elongated opening, a combined seed pusher and penetrating element closer held normally in said opening, said combined member having a valve seat with seed passages, a disc valve on said seat and constructed for opening and closing said seed passages, means mounted on said handle and operatively connected through said elongated tube with said combined seed pusher and penetrating element closer and with said valve respectively for operating the same, and means for rendering said valve inoperative while said combined seed pusher and penetrating element is in said elongated opening.

10. In an appliance for the purposes described, an elongated tube, a crossed handle secured to said tube adjacent one end of the same, a frusto-conical shell having a ring at its end of greater diameter, means secured to said tube adjacent its lower end and to said ring for rigidly holding said shell in place, the axis of the shell and tube coinciding, a combined coupling and rotary valve cage member secured to the end of lesser diameter of said shell, a penetrating element removably secured to said combined member and having an elongated opening, a combined seed pusher and penetrating element closer held normally in said opening and projecting in part through the same, said combined member having a valve seat with seed passages, a disc valve on said seat and constructed for opening and closing said seed passages, means mounted on said handle and operatively connected through said elongated tube with said combined seed pusher and penetrating element closer and with said valve respectively for operating the same, and means for rendering said valve inoperative while said combined seed pusher and penetrating element is in said elongated opening.

11. In an appliance of the character described, an elongated tube, a hollow cone having its base secured to one end of said tube and having an opening in its apex, a seed pusher held in said opening as a closure therefor, means within said cone for holding seed, means for dispensing seed through said apex opening when said pusher is withdrawn into the cone, said means including a valve cage and a rotary valve, means for raising and lowering said pusher, means for rotating said valve to pass or restrain seed according to the position of said valve, and means for locking said valve against operation while said pusher is in said apex opening.

12. In an appliance of the character described, an elongated tube, a hollow cone having its base secured to one end of said tube and having an opening in its apex, a seed pusher held in said opening as a closure therefor, means within said cone for holding seed, means for dispensing seed through said apex opening when said pusher is withdrawn into the cone, said means including a valve cage and a rotary valve, means for raising and lowering said pusher, and means for rotating said valve to pass or restrain seed according to the position of said valve, said pusher raising and lowering means including a reciprocatable rod passing through a rectangular opening in said valve and having a rectangular part to engage in said opening when the pusher is in said apex opening to lock said valve against operation.

13. In an appliance of the character described, an elongated tube, a hollow cone having its base secured to one end of said tube and having an opening in its apex, a seed pusher held in said opening as a closure therefor, means within said cone for holding seed, means for dispensing seed through said apex opening when said pusher is withdrawn into the cone, said means including a valve cage and a rotary valve, means for raising and lowering said pusher, means for rotating said valve to pass or restrain seed according to the position of said valve, and means for locking said valve against operation while said pusher is in said apex opening, said valve having a stem, a stationary valve holding plate above said valve for holding the valve in place in said cage, and an agitator on said stem above said plate, said plate and said valve cage having registering seed passages and said valve having passages to register with said seed passages when the valve is in the open position.

14. In an appliance for the purposes described, an elongated tube having a handle at one end, a disc secured at its center to the other end of said tube, a frusto-conical shell secured at its end of greater diameter to said disc, a combined coupling and rotary valve cage member located within said shell and secured to the end of lesser diameter thereof, said member having a valve seat with seed passages and having a threaded portion, a chambered penetrating element secured by said threads to said member, a rotary valve on said valve seat and having seed passages to register with said seed passages of said cage member and having a tubular stem and having a squared hole at its center, a seed pusher in said penetrating element, a rod on which said pusher is mounted, said rod passing through said squared hole and having a squared portion to fit said hole when said rod is in one position, said rod passing up through said tube, means on said handle to reciprocate said rod, a hollow valve turning rod connected with said valve stem and projecting up through said tube, a handle having a gear segment, said hollow rod having a gear segment to cooperate with said handle, by virtue of which said valve may be turned when said rod has been moved to free its squared part from the squared hole in said valve, and a seed hopper in said shell for delivering seed to said valve for passage into the chamber of said chambered penetrating element.

MURL JOHN KIMBLE.